Patented Dec. 11, 1923.

1,476,805

UNITED STATES PATENT OFFICE.

WILLIAM ALLEN DRUSHEL, OF GRAND RAPIDS, MICHIGAN, ASSIGNOR TO HASKELITE MANUFACTURING CORPORATION, A CORPORATION OF NEW YORK.

PROCESS OF MAKING WATERPROOF BLOOD GLUE.

No Drawing.    Application filed October 27, 1919. Serial No. 333,580.

*To all whom it may concern:*

Be it known that I, WILLIAM A. DRUSHEL, a citizen of the United States, residing at Grand Rapids, county of Kent, State of Michigan, have invented a certain new and useful Improvement in Processes of Making Waterproof Blood Glue, and declare the following to be a full, clear, and exact description of the same, such as will enable others skilled in the art to which it pertains to make and use the same.

A well known glue, possessing powerful adhesive properties and capability of resisting to an unusually high degree the action of the elements, is that made by dissolving a quantity of black albumen, which is dried blood, in a somewhat larger quantity (by weight) of water and mixing therewith a solution of silicate of soda in sufficient amount to bring about a syrupy consistency in the whole.

In preparing this glue it was customary, prior to my invention, to soak the albumen for a few minutes in water, stir the mixture of albumen and water for several hours, usually as much as six hours and sometimes even eight hours, and then to pour in the silicate of soda solution, while still stirring the mixture and continuing the stirring until the reaction was complete.

I have discovered that the time required to carry out the process may be greatly reduced by allowing the albumen to soak in the water, before beginning to stir, until the albumen is completely saturated. This usually takes about an hour, depending somewhat on the age of the albumen and its moisture content. If the soaking is continued insufficiently long to effect complete saturation, the albumen will tend to collect in sticky masses which water will not readily penetrate; thus making stirring difficult and necessitating long stirring in order to effect complete solution. I am thus able to produce the albumen solution in about half the time required where there is no preliminary soaking or a soaking sufficient to bring about only partial saturation.

Often, under the old process, a gritty substance appeared in the glue, this being apparently due to the local reaction of concentrated sodium silicate upon the black albumen because the sodium silicate was either added too rapidly or the stirring did not effect adequate distribution of the sodium silicate throughout the mixture. Within limits, the larger the proportion of silicate of soda, the more strongly marked will be the desirable characteristics of the glue; and, in the case of glue intended to be applied to materials which must be boiled and molded into shape, where it has been customary to use a heavy sodium silicate solution in sufficient quantity to give a sodium silicate content, measured in a dry state, equal to about nine per cent (9%) of the solid blood content, the prevention of the aforesaid gritty substances has been especially difficult.

The formation of gritty substances may be entirely avoided by adding water to the heavy sodium silicate solution to dilute the same, decreasing the amount of water employed in dissolving the albumen by an amount equal to that used in diluting the sodium silicate solution, and then spraying the sodium silicate solution into the blood solution.

My process may perhaps be best explained by an example of actual practice. Thus to from 150 pounds to 170 pounds of water contained in a mixing kettle, I add 130 pounds of dry blood albumen; the albumen is permitted to soak for about an hour; the mixing apparatus is then started and run at a moderate speed for about two hours or until the albumen is completely dissolved; and, while the mixer is still running, 9 pounds to 36 pounds of commercial sodium silicate, (40% to 47% solution) is mixed with about its own weight of water and sprayed into the blood albumen solution. For this purpose I have found an ordinary sprinkling can to be very convenient and satisfactory. After the sodium silicate solution has been introduced the mixer is allowed to run for a period of from three to five minutes at the end of which time the glue is ready for use.

In the example given, when the smallest named amount of sodium silicate is employed a glue will be produced which will serve for many purposes but will not always have the necessary qualities which will permit the glued product to be boiled and molded into compound curves without injury to the glued joint. A higher proportion of the sodium silicate to the dry blood improves the character of the glue in respect of its use in the production of plywood which is to be molded into compound curves. I have mentioned a wide range of limits for the sodium silicate because my invention is not limited to any particular proportions that may be required to produce definite properties in the glue, but is broad enough in its application to cover the making of any glue formed out of water, blood albumen and sodium silicate; for the time required to manufacture any glue of this kind will be reduced and the danger of the formation of gritty substances in the glue as heretofore explained will be avoided through the employment of my process.

I claim:

1. The process of manufacturing waterproof glue which consists in soaking blood albumen in a quantity of water somewhat greater in weight than the weight of the dry albumen for about an hour, then stirring the mixture until the albumen is completely dissolved, and then introducing into the solution a solution of silicate of soda and simultaneously stirring the mixture.

2. The process of manufacturing waterproof glue which consists in soaking blood albumen in a quantity of water somewhat greater in weight than the weight of the dry albumen for about an hour, then stirring the mixture until the albumen is completely dissolved, and then spraying into the solution a solution of silicate of soda and simultaneously stirring the mixture.

3. The process of manufacturing waterproof glue which consists in dissolving blood albumen in a quantity of water somewhat greater in weight than the weight of the dry albumen, and then spraying into the solution a solution of silicate of soda and simultaneously stirring the mixture.

4. The process of manufacturing waterproof glue which consists in dissolving blood albumen in a quantity of water somewhat greater in weight than the weight of the dry albumen, and then spraying into the solution a dilute solution of silicate of soda containing a quantity of dry silicate of soda equal to from about three per cent (3%) to about twelve per cent (12%) of the weight of the dry albumen and simultaneously stirring the mixture.

5. The process of manufacturing waterglue which consists in dissolving blood albumen in water in the proportions of 136 pounds of dry albumen to from 150 to 170 pounds of water, spraying into the solution in the proportion of from 9 to 36 pounds of a forty per cent (40%) to forty-seven per cent (47%) solution of commercial sodium silicate mixed with about its own weight of water, and stirring the blood albumen solution during the spraying operation.

6. The process of manufacturing waterproof glue which consists in dissolving blood albumen in water in the proportions of 136 pounds of dry albumen to form 150 to 170 pounds of water, introducing into the solution in the proportion of from 9 to 36 pounds of a forty per cent (40%) to forty-seven per cent (47%) solution of commercial sodium silicate mixed with about its own weight of water, and stirring the blood albumen solution while introducing the sodium silicate solution.

In testimony whereof, I sign this specification.

WILLIAM ALLEN DRUSHEL.